Figure 1:
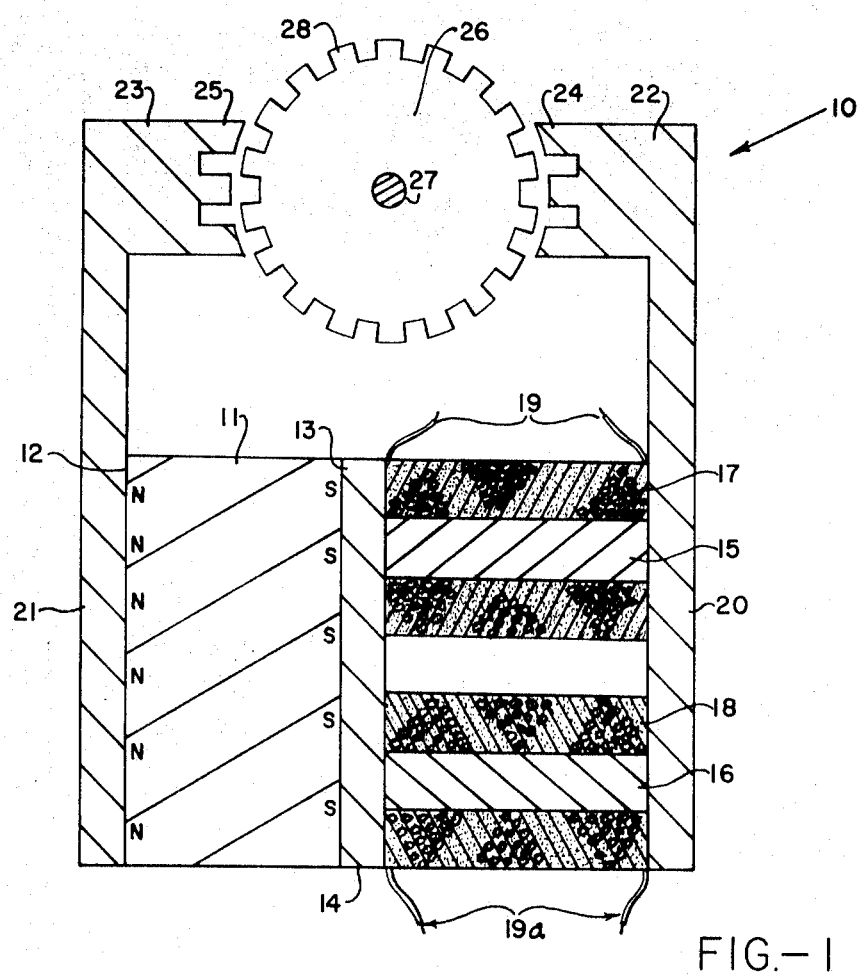

United States Patent

[11] 3,619,678

| [72] | Inventor | Edgar J. Ruof |
| | | Akron, Ohio |
| [21] | Appl. No. | 4,934 |
| [22] | Filed | Jan. 22, 1970 |
| [45] | Patented | Nov. 9, 1971 |
| [73] | Assignee | The Goodyear Tire & Rubber Company |
| | | Akron, Ohio |

[54] DUAL OUTPUT AC TRANSDUCER
4 Claims, 2 Drawing Figs.

[52] U.S. Cl. ................................................. 310/155,
310/153, 310/168
[51] Int. Cl. ........................................................ H02k 21/38
[50] Field of Search ......................................... 310/155,
168, 153, 46

[56] References Cited
UNITED STATES PATENTS

| 1,998,409 | 4/1935 | Klaiber | 310/155 |
| 2,419,301 | 4/1947 | Tragesser | 310/155 |
| 2,443,691 | 6/1948 | Morrison | 310/168 X |
| 2,662,996 | 12/1953 | Martin | 310/155 X |
| 2,669,670 | 2/1954 | Eggers | 310/168 |
| 2,824,245 | 2/1958 | Trevitt | 310/168 |
| 2,853,638 | 9/1958 | Bonnano et al. | 310/154 |
| 3,252,024 | 5/1966 | Loudon | 310/155 |
| 3,408,556 | 10/1968 | Gabor | 310/168 UX |
| 3,473,061 | 10/1969 | Soehner et al. | 310/168 X |
| 3,492,518 | 1/1970 | Andrews et al. | 310/168 |
| 3,504,538 | 4/1970 | Wayne | 310/168 X |

*Primary Examiner*—D. F. Duggan
*Assistant Examiner*—Mark O. Budd
*Attorneys*—F. W. Brunner, P. E. Milliken and Oldham & Oldham

ABSTRACT: The transducer includes a permanent magnet with opposite poles on a pair of opposite face surfaces thereof, a pair of inductive coil assemblies operatively positioned with corresponding ends thereof adjacent one of the magnet poles, a rotatable magnetic disc with a plurality of uniformly spaced teeth thereon, and elongate pole pieces operatively engaging the remaining pole of the magnet and the other ends of the coil assemblies. The pole pieces are positioned in opposed relation with the magnetic disc therebetween and have uniform, circumferentially equally spaced teeth thereon corresponding to teeth on the magnetic disc to induce electrical pulses in the coil assemblies with rotation of the magnetic disc.

PATENTED NOV 9 1971 3,619,678

INVENTOR
EDGAR J. RUOF
BY:
Oldham & Oldham
ATTORNEYS

DUAL OUTPUT AC TRANSDUCER

This invention relates to transducers, and especially to relatively small, uncomplicated transducers adapted to provide two identical signals from one unit and adapted for use as a tachometer generator.

PRIOR ART

Heretofore there have been various types of pulse generators, primarily transducers, provided for a variety of uses. In the control of skidding of vehicle wheels, and particularly in aircraft, it is quite desirable that a rapid speed indication signal be provided and the control system show when a skid situation is developing. It is very desirable that a large number of pulses be provided per wheel revolution and these pulses be fed to proper control circuitry in order to effect a desired control action in assemblies of this type. The prior art has used various systems to indicate by a frequency measurement the speed of rotation of the wheel. U.S. Pat. No. 3,017,145 teaches one example of utilization of electrical generator adapted for sensing the speed of wheel rotation by utilizing permanent magnets and a pole relationship to obtain frequency. A proximity coil with pole pieces is used to measure wheel rotation in the system described in U.S. Pat. No. 3,233,946.

The general object of the present invention is to provide a novel and improved dependable transducer for use in a pulse generation system and particularly for use in systems using pulse generation for measuring, instantaneously, wheel speed.

Another object of the invention is to provide a relatively uncomplicated, sturdy transducer, or pulse generator which normally provides two identical signals, and which can function even though one signal-generating portion of the apparatus has been short-circuited, or opened.

Another object of the invention is to provide an improved AC tachometer generator made from substantially conventional members of which is of a compact, sturdy construction and wherein a pair of inductive coil assemblies are provided in parallel in the system.

Another object of the invention is to provide a transducer which utilizes a pair of inductive coil assemblies, a permanent magnet and a rotating magnetic member to provide pulse generation to indicate wheel speeds instantaneously.

The foregoing and other objects and advantages of the invention will be made more apparent as the specification proceeds.

Corresponding numerals are used on the members shown in the drawings and referred to in the specification to facilitate comparison therebetween.

Figure 2:
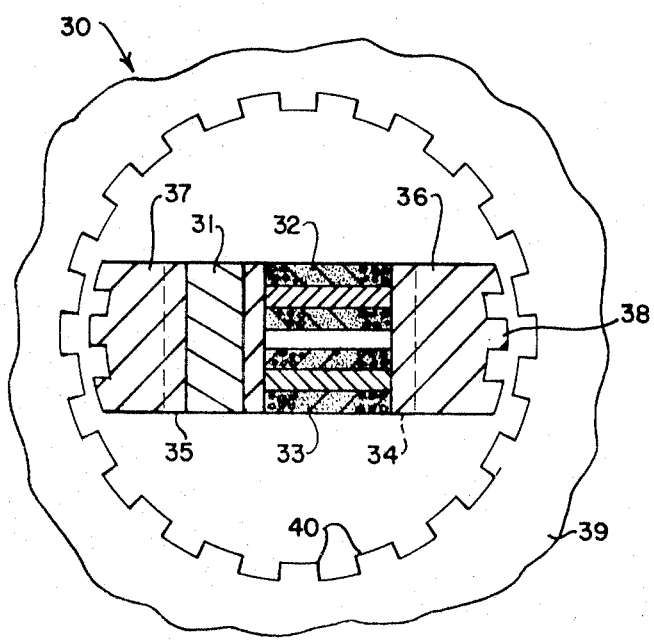

In the accompanying drawings:

FIG. 1 is a section through a transducer embodying the principles of the invention; and FIG. 2 is a section through a modified transducer of the invention.

SUBJECT MATTER OF THE INVENTION

A dual output AC transducer, as one embodiment of the invention, is provided and it comprises an elongate permanent magnet having opposite poles formed on a pair of face surfaces thereof, a pair of inductive coil assemblies positioned with corresponding ends thereof operatively engaging one of the poles, the coil assemblies being on parallel axes, a rotatable magnetic disc having a plurality of uniformly spaced teeth thereon, and elongate pole pieces operatively engaging the opposite pole of the magnet and the other ends of the coil assemblies and extending therefrom to position end portions thereof in opposed relation with said magnetic disc therebetween. Such end portions have several uniform, equally circumferentially spaced teeth corresponding to the teeth on the magnetic disc provided thereon and spaced radially uniformly from the teeth on the magnetic disc whereby pulses will be generated in the inductive coil assemblies with rotation of the magnetic disc to indicate the speed of rotation thereof.

Reference now is directed to the details of the structure shown in the accompanying drawings, and the dual output AC tachometer generator or transducer is indicated as a whole by the numeral 10. This transducer, or pulse generator includes any conventional permanent magnet 11, which is usually elongate, and which has been magnetized in the direction so that North and South poles are formed on opposite faces 12 and 13, respectively, of the magnet. A pole plate 14 usually is positioned against the face 13 and such pole plate is made from a good conductor of magnetic flux, usually soft iron. This pole plate 14 has a pair of inductive coil assemblies operatively associated therewith. Thus, as shown in the drawings, good magnetic flux conductor cores 15 and 16 each have one end thereof abutted against a surface of the pole plate 14 and inductive coils 17 and 18, respectively, are wound around the cores 15 and 16 in the usual manner. Pairs of leads 19, 19 and 19a, 19a connect to the ends of the wires forming the coils 17 and 18, respectively, and are indicated extending therefrom for carrying the two sets of induced pulse signals from the transducer 10 to any desired control or measuring circuit, as an antiskid control system. The opposite ends of the cores 15 and 16 are abutted against a good flux conductive member 20 which may be considered to be a pole piece in the magnetic circuit. Likewise, a second pole piece 21 engages the face 12 of the magnet 11 and both of the pole pieces 20 and 21 protrude from the assembly of the magnet 11 and inductive coils in the same direction and have inwardly turned end sections 22 and 23 formed thereon. These end sections each have a series of inwardly facing, uniformly sized and uniformly circumferentially spaced teeth 24 and 25 formed thereon, respectively. These end sections 22 and 23 are positioned so that the teeth 24 and 25 are immediately adjacent the periphery of a magnetic disc 26 that is suitably positioned on a shaft 27, which shaft is connected to any desired rotatable member, such as a vehicle wheel, so that the disc 26 will rotate at a speed corresponding to or identical with the vehicle wheel speed. It should be understood that the disc 26 is fairly thick as to be distinguished from thin paper or sheet metal. The disc preferably has about the same thickness as the end sections 22 and 23 and teeth 24 and 25. Hence, the transducer 10 can be used for indicating, instantaneously, variations in the speed of rotation of the shaft 27 and the vehicle wheel represented thereby. The periphery of the disc 26 has a number of teeth 28 formed thereon which teeth are spaced uniformly the same distance as the teeth 24 and 25 and are positioned in closely radially spaced relation therewith whereby on rotation of the disc 26, as the reluctance of the magnetic flux flow path varies with the teeth 24 and 25 being immediately aligned with one or more of the teeth 28, or being spaced therefrom, then voltages corresponding to such changes in reluctance will be induced immediately in the coils 17 and 18. The reluctance changes will cause corresponding changes in the flux density in the cores 15 and 16 for corresponding voltages to be induced in the coils 17 and 18. Such voltage pulses will be withdrawn from the coils by the leads 19 or 19a for antiskid control use or other action, as desired.

It should be noted that the transducer 10 has the components thereof associated with each other so as to form a good magnetic flux flow path between the pole pieces 20 and 21 and the associated inductive coil assemblies and the magnet 11. Usually in use, the various parts of the transducer such as the magnet 11, pole plate 14, coil assemblies and adjacent lengths of the members or pole pieces 20 and 21 are encased in a suitable carrier medium, such as by potting the transducer in resinous material in the usual manner. This provides a sturdy magnetic transducer assembly that will function effectively and have a good service life under even difficult operating conditions.

FIG. 2 shows a slight modification of the structure of FIG. 1 wherein a transducer 30 is provided that has a magnet 31 therein, a pair of conductive coil assemblies 32 and 33 as described before, and the pole pieces 34 and 35 corresponding to the pole pieces 20 and 21 of FIG. 1. In this instance, the end sections 36 and 37 provided on the pole pieces are turned outwardly of the transducer and have suitable teeth 38 provided thereon. In this instance, a magnetic ring 39 is provided that has radially inwardly extending teeth 40 provided on it. The ring 39 is mounted on any rotatable member, usually a vehicle wheel, and rotates therewith whereby the teeth provided on the ring and those on the pole pieces will be brought into and out of radial alignment with each other for changing the reluctance in the magnetic flux path so that pulses are induced in the coil assemblies corresponding to the wheel speed as described hereinbefore. Again, the components of the transducer 30 can be assembled in any desired or known manner and be retained in operative condition as by embedding the components thereof in a suitable potting material.

Yet a further feature of the invention is that if one of the coils 17 and 18 or equivalents provided in the transducers is short circuited, the voltage induced in the other coil will not be reduced but will instead be slightly increased. This is because the increased current in the shorted coil will cause increased counter flux to be developed in the core of the shorted coil. This will cause a greater percent of flux change to occur in the core in the unshorted coil and will thus cause a corresponding increase in voltage from that coil. The pulse frequency of course would not be varied by any such short circuit.

From the foregoing, it is seen that a large number of pulses can be generated in a relatively small, sturdy transducer assembly where, even on rapid changes in rotation of the magnetic disc or wheel in the unit, pulses will be provided for rapidly and instantaneously measuring wheel speed changes. Hence, it is believed that the objects of the invention have been achieved.

While certain representative embodiments and details have been shown for the purpose of illustrating the invention, it will be apparent to those skilled in this art that various changes and modifications may be made therein without departing from the spirit or scope of the invention.

What is claimed is:

1. A dual output AC transducer comprising a permanent magnet having opposite poles formed on a pair of face surfaces thereof, a pair of inductive coil assemblies operatively positioned with corresponding ends thereof adjacent and in flux conducting relation to a common one of said poles, said coil assemblies having flux conductive cores on parallel axes and said coil assemblies being positioned adjacent each other in parallel relation so the normal flux path of each coil assembly receives a common flux impulse which passes through the cores of the adjacent coil assemblies in the same direction, a rotatable magnetic permeable member having a plurality of uniformly spaced teeth thereon, and elongate pole pieces operatively engaging the opposite pole of said magnet and the other ends of said coil assemblies and having end portions extending therefrom, said end portions being operatively associated with said rotatable member and having several uniform circumferentially equally spaced teeth corresponding to the teeth on said rotatable member thereon for inducing voltage pulses in said coil assemblies from common flux pulses generated by rotation of said rotatable member.

2. A dual output AC transducer as in claim 1 where the frequency of the induced voltage pulses from either of said coils can be used to measure the speed of rotation of said rotatable member, the teeth on said pole pieces and on said rotatable member being of the same circumferential length.

3. A dual output AC transducer as in claim 1 where equal voltages are induced in said coils and a short circuit in one of said coils produces an increase in induced voltage in the other coil, said coils being connected in parallel in a magnetic circuit.

4. A dual output AC transducer as in claim 1 where the frequency of the induced voltages in said coils can be used to measure speed of rotation of said disc, both of said coils having output leads.

* * * * *